United States Patent [19]

Fajans et al.

[11] Patent Number: 4,918,698
[45] Date of Patent: Apr. 17, 1990

[54] METHOD OF SUPPRESSING FEEDBACK OSCILLATIONS IN FREE ELECTRON LASERS

[75] Inventors: Joel Fajans, Berkeley, Calif.; Jonathan Wurtele, Brookline, Mass.

[73] Assignee: Regents of the University of California, Berkeley, Calif.

[21] Appl. No.: 315,500

[22] Filed: Feb. 24, 1989

[51] Int. Cl.⁴ .............................................. H01S 3/00
[52] U.S. Cl. ........................................................ 372/2
[58] Field of Search ............................................ 372/2

[56] References Cited

U.S. PATENT DOCUMENTS 4,845,218  7/1989  Pistoresi .................................. 372/2

Primary Examiner—Léon Scott, Jr.
Attorney, Agent, or Firm—Flehr, Hohbach, Test, Albritton & Herbert

[57] ABSTRACT

Feedback oscillations in a free electron laser are suppressed without significantly degrading the laser performance by means of an attenuator placed in a linear gain zone of its interaction region.

5 Claims, 2 Drawing Sheets

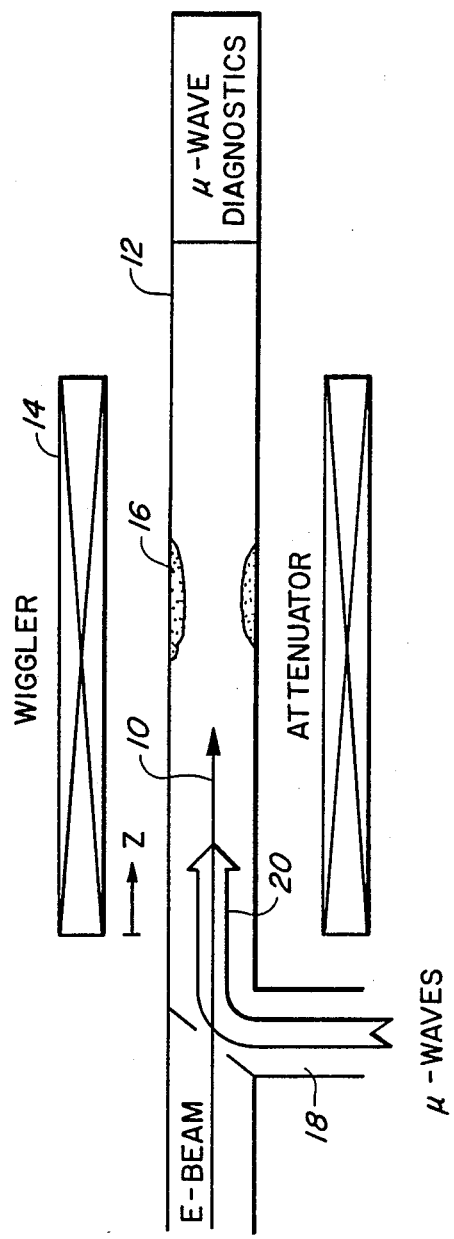
FIG._1.

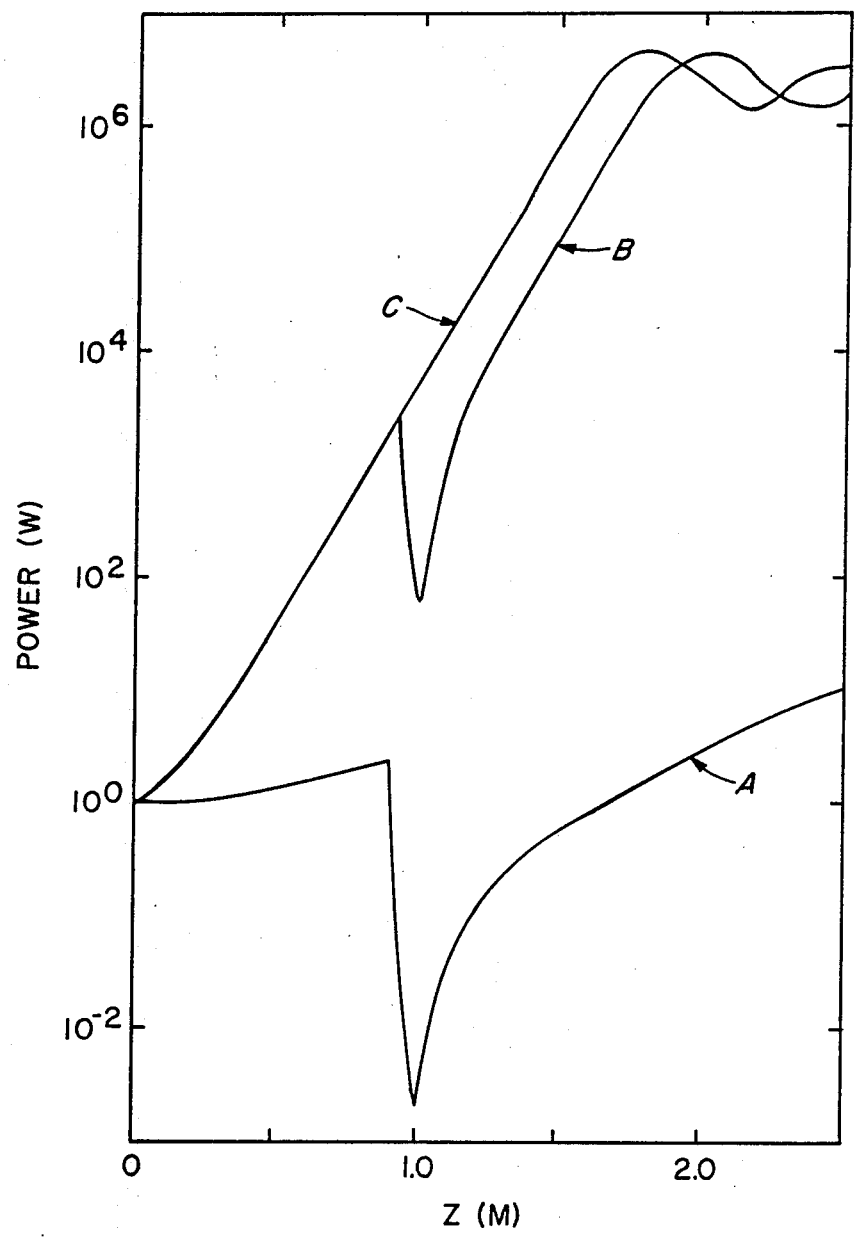
FIG._2.

METHOD OF SUPPRESSING FEEDBACK OSCILLATIONS IN FREE ELECTRON LASERS

BACKGROUND OF THE INVENTION

This invention relates to a method of suppressing feedback oscillations in free electron lasers.

This invention was made with Government support under Grant No. PHY83-06077 awarded by the National Science Foundation, and Contract No. N00014-80-C-0062 awarded to the Office of Naval Research. The Government has certain rights in this invention.

Free electron lasers are currently under investigation as a promising source of high power microwave and millimeter wave radiation. The free electron laser produces coherent radiation by subjecting a cold, intense electron beam to a periodic "wiggler" magnetic field which causes the electron beam to oscillate transversely, and this periodic oscillation couples via the ponderomotive force to a longitudinal plasma oscillation. The net induced oscillating current drives the coherent output radiation with the energy for the radiation coming at the expense of the beam kinetic energy. The outstanding properties of the free electron laser include not only high efficiencies and output powers but also its inherent frequency tunability. Unlike klystrons and traveling wave tubes, free electron lasers are fast wave devices and are not limited, by size constraints, to low power levels at high frequencies and, unlike gyrotrons, they are readily operable as an amplifier.

With traveling wave tubes, one of the major problems has always been oscillations caused by waves on the slow-wave interaction circuit flowing in a direction opposite to that of the signal being amplified. As with any such high gain amplifiers, free electron lasers are also subject to so-called feedback oscillations, that is, a small fraction of the output power reflected backward to the input and reamplified to produce regenerative gain and eventual oscillations. Observation of such oscillations in a free electron laser was reported, for example, in "Microwave Studies of a Tunable Free Electron Laser in Combined Axial and Guide Magnetic Fields" by J. Fajans, G. Bekefi, Y. Z. Yin and B. Lax published in Phys. Fluids 28, 1995-2006 (1985) when the wiggler magnetic field strength exceeded a certain threshold value and these oscillations precluded gain measurements above 20 dB. Use of such feedback oscillations to measure the free electron gain has been reported in "Gain Measurements from Start-up and Spectrum of a Raman Free Electron Laser Amplifier" by J. Masud, T. C. Marshall, S. P. Schlesinger and F. G. Yee in Phys. Rev. Lett. 56, 1567-1570 (1986) and in "High Gain Long Pulse Free Electron Laser Oscillator" by J. Mathew and J. A. Pasour in Phys. Rev. Lett. 56, 1805-1808 (1986). The backward waves may be initially caused by reflection from a mismatched output circuit. At microwave and millimeter wavelength regions, it becomes difficult to design input and output couplers with voltage standing wave ratios (VSWR) less than 1.05. Consequently, gains above 30 dB are difficult to achieve and, at substantially lower gains, phase control is imprecise.

SUMMARY OF THE INVENTION

It is therefore an object of the present invention to provide a method of suppressing feedback oscillations in a free electron laser.

A method according to the present invention of suppressing feedback oscillations in a free electron laser is characterized by the placing of a strong waveguide attenuator in the middle of the free electron laser interaction region. In front of the attenuator, or on the upstream side thereof regarding the direction of the motion of electrons, the interaction proceeds normally and the signal injected into the free electron laser grows to some intermediate value. The attenuator then sharply attenuates the microwave signal which, however, is quickly regenerated by the bunched electron beam. The electron beam passes undisturbed through the attenuator. On the downstream side of the attenuator, the interaction once more proceeds normally.

It has been known to suppress feedback oscillations in a helix-type traveling wave tube by placing an attenuator in the helix. The present invention is based on the present inventors' numerical studies of the performance of an free electron laser in which a similar technique is employed.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a schematic of a free electron laser with an attenuator inserted according to a method of suppressing feedback oscillations embodying the present invention, and FIG. 2 is a graph showing the relationship between signal power and interaction length in the free electron laser shown in FIG. 1.

DETAILED DESCRIPTION OF THE INVENTION

Operation of a free electron laser has been described in detail, for example, in "Effects of Electron Prebunching on the Radiation Growth Rate of a Collective (Raman) Free-Electron Laser Amplifier" by C. Leibovitch, K. Xu and G. Bekefi (IEEE Journal of Quantum Electronics, 24, 1825 (September 1988)). As drawn schematically in FIG. 1, electron beam 10 is guided magnetically into an evacuated drift tube 12 which also acts as a cylindrical waveguide. Beam integrity is maintained by a uniform axial guide field (the solenoid providing this magnetic field being not shown). Experimental measurements and electron-gun computer simulations indicate that the beam-energy spread is less than 0.5%. A helical wiggler 14 of length 2.5 m and periodicity 3.3 cm is generated by bifilar conductors wound on the drift tube 12 and provides a wiggler field. A substantially reflectionless attenuator with attenuation (4 dB/cm) greater than the gain of the laser (symbolically indicated at 16) of 10 cm in length (or 40 dB total) is disposed inside the tube 12 between z=90 cm and 100 cm where z is the longitudinal distance along the tube 12, measured from the upstream end (with reference to the direction of propagation of the electron beam 10) of the wiggler 14. Such an attenuator may be an annular graphite piece with gradually varying thickness attached onto the inner surface of the waveguide 12.

Microwave power of 1 watt and 60 GHz is injected into the tube 12 through a wave launcher 18 such that the input microwave signal 20 is superimposed onto the electron beam 10, converted into a linearly polarized $TE_{11}$ mode. Their interaction is studied by a numerical simulation method described by J. Fajans, J. S. Wurtele, G. Bekefi, D. S. Knowles and K. Xu in "Nonlinear Power Saturation and Phase (Wave Refractive Index) in a Collective Free-Electron Laser Amplifier" (Phys. Rev. Lett., 57, 579 (1986)). The simulation allows for a collective space charge wave on a finite radius beam, the transverse structure of the waveguide mode, three-dimensional wiggler fields, the axial guide magnetic field and the mildly relativistic electron beam. Three-dimensional effects are included by using appropriately calculated input parameters and analytic expressions for the transverse electron motion. The simulation is one-dimensional and assumes that the signal propagates in the $TE_{11}$ waveguide mode.

In FIG. 2, which shows the relationship between signal power and the laser interaction distance (or z, as defined above), Curve A represents a situation where the wiggler field is relatively low and the electron beam 10 is not strongly bunched by the periodic magnetic field of the wiggler 14 before it enters the region of the attenuator 16. In the attenuator region (between z=90 cm and 100 cm), there is almost 40 dB of attenuation. Curve B represents the laser performance at higher wiggler field and higher gain. Curve C represents the situation identical to that of Curve B except the attenuator 16 is removed. It is evident from a comparison between Curves B and C that the main effects of the attenuator 16 are localized in its immediate vicinity. Both Curves B and C show that the electron beam is strongly bunched by the stronger wiggler field in the interaction region before it enters the attenuation region (from z=90 cm to z=100 cm). The total attenuation (shown by Curve B) is significantly reduced from 40 dB and the growth rate is enhanced immediately after the beam passes the attenuator region. This increased growth rate and reduced attenuation is due to the unusually strong laser interaction that results from the strongly bunched beam. Farther downstream, the growth rate of Curves B is largely unchanged from that of Curve C. Curves B and C both rise substantially identically except the saturation point of Curve B is delayed by about 15 cm. It is noteworthy that the saturated power level is substantially the same between Curves B and C. In conclusion, the attenuator 16 significantly reduces feedback oscillations without degrading the performance of the free electron laser.

The foregoing description of a preferred embodiment of the invention has been presented for purposes of illustration and description. It is not intended to be exhaustive or to limit the invention to the precise form disclosed, and many modifications and variations are possible in light of the above teaching. For example, the attenuator need not comprise an annular graphite piece but may be, for example, a dissipative but otherwise non-interacting matrix, although not separately shown. It need not be placed exactly at the position described above. Surveys have demonstrated that the device behavior is not extremely sensitive to the attenuator position as long as the attenuator remains well within the region of a linear gain. If the attenuator is placed near the saturation zone, the output power is reduced, as expected. The device bandwidth is not substantially changed by the attenuator. The observed growth and loss rates near the attenuator are quite large in relation to the microwave wavelength (0.5 cm) and actual device behavior may therefore be somewhat different from the performance predicted by a computer simulation. It is also to be noted that the method of the present invention is not limited to suppression of feedback oscillations in free electron lasers operating in microwave and millimeter ranges. It is equally applicable in the visible and shorter-wavelength ranges.

What is claimed is:

1. In a method of suppressing feedback oscillations in a free electron laser having an elongated waveguide, means for providing an electron beam propagating through said waveguide, means for superimposing microwave energy onto said electron beam, and means for providing a wiggler field to provide an interaction region inside said waveguide, the improvement wherein said method comprises placing an attenuator in said interaction region inside said waveguide.

2. The method of claim 1 wherein said attenuator is substantially reflectionless.

3. The method of claim 1 wherein said attenuator comprises graphite.

4. The method of claim 1 wherein said attenuator comprises a dissipative but otherwise non-interacting matrix.

5. The method of claim 1 wherein said attenuator is placed at a position in said interaction region where the gain increases substantially linearly.

* * * * *